(12) United States Patent
Kim et al.

(10) Patent No.: US 7,448,787 B2
(45) Date of Patent: Nov. 11, 2008

(54) PRISM SHEET AND BACKLIGHT UNIT EMPLOYING THE SAME

(75) Inventors: Jin-hwan Kim, Suwon-si (KR); Hwan-young Choi, Anyang-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 7 days.

(21) Appl. No.: 11/285,366

(22) Filed: Nov. 23, 2005

(65) Prior Publication Data
US 2006/0109681 A1 May 25, 2006

(30) Foreign Application Priority Data
Nov. 24, 2004 (KR) .................. 10-2004-0097046

(51) Int. Cl.
*F21V 7/04* (2006.01)
(52) U.S. Cl. .................................. 362/620; 362/629
(58) Field of Classification Search ............ 362/600, 362/606–608, 610, 614, 618–620, 626–629
See application file for complete search history.

(56) References Cited

U.S. PATENT DOCUMENTS

| 5,627,923 | A | * | 5/1997 | Kakizaki ............... 385/14 |
| 5,890,791 | A | * | 4/1999 | Saito .................. 362/620 |
| 6,123,431 | A | * | 9/2000 | Teragaki et al. ........ 362/625 |
| 6,154,262 | A | | 11/2000 | Ogura |
| 6,234,639 | B1 | * | 5/2001 | Noguchi ................ 362/600 |
| 6,276,803 | B1 | * | 8/2001 | Aoyama et al. .......... 353/81 |
| 6,769,782 | B2 | * | 8/2004 | Lee .................... 362/600 |
| 6,989,873 | B2 | * | 1/2006 | Hua-Nan et al. ......... 349/64 |
| 7,046,318 | B2 | * | 5/2006 | Yu et al. .............. 349/64 |
| 7,072,096 | B2 | * | 7/2006 | Holman et al. ......... 359/298 |
| 7,086,772 | B2 | * | 8/2006 | Hsu et al. ............ 362/619 |
| 2003/0099118 | A1 | * | 5/2003 | Saitoh et al. ......... 362/561 |
| 2006/0083022 | A1 | * | 4/2006 | Pan et al. ............ 362/600 |

FOREIGN PATENT DOCUMENTS

EP 0 872 758 A1 10/1998
EP 1 326 102 A1 7/2003

* cited by examiner

*Primary Examiner*—Anabel Ton
*Assistant Examiner*—Julie A. Shallenberger
(74) *Attorney, Agent, or Firm*—Sughrue Mion, PLLC

(57) ABSTRACT

Provided is a prism sheet including a substrate transmitting incident light and having at least one groove inwardly formed in a surface of the substrate. A refractive member is provided in the groove and has a relatively higher refractive index than a refractive index of the substrate. A prism is arranged to face the refractive member, refract and transmit incident light, and has a relatively lower refractive index than the refractive index of the refractive member. A backlight unit is provided that includes at least one light source emitting light, along with a light guide panel that guides a procession of light emitted from the light source. The prism sheet includes at least one groove inwardly formed in a surface of the light guide panel. A refractive member is provided in the groove and a prism is arranged to face the refractive member.

26 Claims, 8 Drawing Sheets

PRISM SHEET AND BACKLIGHT UNIT EMPLOYING THE SAME

CROSS-REFERENCE TO RELATED PATENT APPLICATIONS

This application claims priority from Korean Patent Application No. 10-2004-0097046, filed on Nov. 24, 2004, in the Korean Intellectual Property Office, the disclosure of which is incorporated herein in its entirety by reference.

BACKGROUND OF THE INVENTION

1. Field of the Invention

Apparatuses consistent with the present invention relate to a prism sheet and a backlight unit employing the same, and more particularly, to a prism sheet which can refract and transmit incident light, and to a backlight unit employing the same.

2. Description of the Related Art

In general, a backlight unit is used as a light source for a liquid crystal display (LCD) device having no self-illuminating capability and classified as a direct type backlight unit or an edge type backlight unit according to a position of the light source. In the direct type backlight unit, a lamp installed on a rear side of the LCD device emits light directly to a liquid crystal panel. In the edge type backlight unit, a lamp is installed at an edge of a light guide panel (LGP) and the light emitted by the lamp is guided by the LGP to proceed toward the liquid crystal panel.

FIG. 1 is a cross-sectional view of a conventional edge type backlight unit. Referring to FIG. 1, a cold cathode fluorescent lamp (CCFL) 1 is installed at an edge of an LGP 3. The LGP 3 has a tapered shape and a dispersion pattern 4 is formed on a lower surface of the LGP 3.

A reflection panel 5 is formed on the lower surface of the LGP 3 to reflect the light emitted from the CCFL 1 toward an LCD panel 20. Thus, the light emitted from the CCFL 1 is incident on the LGP 3 via an edge 3a. The incident light is changed to a surface light by the LGP 3 and the reflection panel 5 and proceeds toward an upper surface 3b of the LGP 3.

A diffusion panel 7 and a pair of prism sheets 10 are arranged on and above the upper surface 3b of the LGP 3. Each of the prism sheets 10 has a plurality of prisms arranged to neighbor one another. The prism sheets 10 include first and second prism sheets 10a and 10b which are divided according to the direction of arrangement and the role of the prisms. The prism arrangement directions of the first prism sheet 10a and the second prism sheet 10b are perpendicular to each other. The first prism sheet 10a corrects a vertical path, or a direction perpendicular to the plane of a drawing sheet, of the incident light having passed the LGP 3 and the diffusion panel 7, while the second prism sheet 10b corrects a horizontal path of the incident light. Thus, since the proceed paths of the incident light are corrected by the first and second prism sheets 10a and 10b, the corrected light can proceed toward the LCD panel 20.

A polarization panel 15 is provided between the prism sheet 10 and the LCD panel 20. The polarization panel 15 transmits light of a particular polarization only of incident light which has passed through the prism sheet 10, to proceed toward the LCD panel 20. Thus, the light exiting from the upper surface of the LGP 3 is diffused by the diffusion panel 7 and proceeds toward the LCD panel 20 with a path corrected by the prism sheets 10a and 10b.

The prism sheet 10, as shown in FIG. 2, includes an incident portion 11 having an incident surface 11a and a plurality of prisms 13 formed on the opposite surface of the incident surface 11a, each having first and second exit surfaces 13a and 13b. The prism sheet 10 is disposed in air having a refractive index $n_0$. The incident portion 11 and the prism 13 are integrally or separately formed of the same material having the same refractive index n. Thus, incident light $L_1$ incident on the incident portion 11 is refractively incident on the incident portion 11 at an exit angle $\theta'$ smaller than an incident angle $\theta$. This is applied to all light incident on the incident portion 11. The light incident on the incident portion 11 linearly transmits at a boundary portion 12 between the incident portion 11 and the prism 13 without being refracted. In contrast, since the refractive index n of the prism 13 is higher than the refractive index n0 of the external air, the light incident on the first or second exit surfaces 13a and 13b exits at a refractive angle greater than the incident angle when the light is incident at an angle smaller than a critical angle $\theta_C$, and the light incident at an angle greater than the critical angle $\theta_C$ is totally internally reflected.

Thus, while light $L_1$, $L_2$ and $L_3$ of the light incident on the incident surface 11a are used as an effective light by exiting through the first or second exit surfaces 13a and 13b of the prism 13, lights $L_4$ and $L_5$ do not exit through the first or second exit surface 13a or 13b of the prism 13 and are totally internally reflected to proceed toward the incident surface 11a. Also, light $L_6$ does not proceed toward the LCD panel 20 of FIG. 1 although it passed through the first and second exit surfaces 13a and 13b. Thus, since only a part of the light emitted from the light source 1 is used as the effective light, optical efficiency is deteriorated.

Further, since the backlight unit, configured as noted above, separately includes the light guide panel, the diffuser, and the prism sheet, the overall configuration is complicated and manufacturing costs rise.

SUMMARY OF THE INVENTION

The present invention provides a prism sheet which has a prism structure to refractively transmit most of incident light.

Embodiments consistent with the present invention provide a backlight unit employing the above described prism sheet to improve optical efficiency, in which the overall structure is made compact by incorporating constituent elements.

According to an aspect of the present invention, a prism sheet comprises a substrate transmitting incident light and having at least one groove inwardly formed in a surface of the substrate, a refractive member provided in the groove and having a relatively higher refractive index than a refractive index of the substrate, and a prism arranged to face the refractive member, refracting and transmitting incident light, and having a relatively lower refractive index than the refractive index of the refractive member.

According to another aspect of the present invention, a prism sheet comprises a substrate transmitting incident light, having a plurality of grooves inwardly formed in a surface of the substrate in an inverted triangular shape, and formed of acryl-based resin, a refractive member provided in each of the grooves and formed of a material selected from a group consisting of cyclic olefin copolymer, polycarbonate, and polyetherimide having a relatively higher refractive index than a refractive index of the substrate, and a prism arranged to face the refractive member, refracting and transmitting incident light, and formed of acryl-based resin having a relatively lower refractive index than the refractive index of the refractive member.

According to another aspect of the present invention, a backlight unit comprises at least one light source emitting light, a light guide panel guiding procession of light emitted from the light source and incident on a side surface of the light guide panel and having a light exit surface through which the light exits, a reflective panel separated a predetermined distance from a surface opposite to the light exit surface of the light guide panel and reflecting incident light toward the light exit surface, and a prism sheet which comprises at least one groove inwardly formed in a surface of the light guide panel, a refractive member provided in the groove and having a relatively higher refractive index than a refractive index of the light guide panel, and a prism arranged to face the refractive member, refracting and transmitting incident light, and having a relatively lower refractive index than the refractive index of the refractive member.

According to another aspect of the present invention, a backlight unit comprises at least one light source emitting light, a light guide panel guiding procession of light emitted from the light source and incident on a side surface of the light guide panel and having a light exit surface through which the light exits, a reflective panel separated a predetermined distance from a surface opposite to the light exit surface of the light guide panel and reflecting incident light toward the light exit surface, a prism sheet which comprises a plurality of grooves inwardly formed in a surface of the light guide panel, a plurality of refractive members provided in the grooves, having a relatively higher refractive index than a refractive index of the light guide panel, and arranged such that the refractive index increases from a portion close to the light source to a portion located far from the light source, and a plurality of prisms arranged to face the refractive members, refracting and transmitting incident light, and having a relatively lower refractive index than the refractive index of the refractive member, a diffusive member formed of a plurality of beads distributed in the light guide panel and diffusing and transmitting incident light, and a second prism sheet arranged between the light guide panel and the reflective panel and comprising a plurality of prisms refracting and transmitting incident light in a direction.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY, NON-LIMITING EMBODIMENTS OF THE INVENTION

Figure 1:
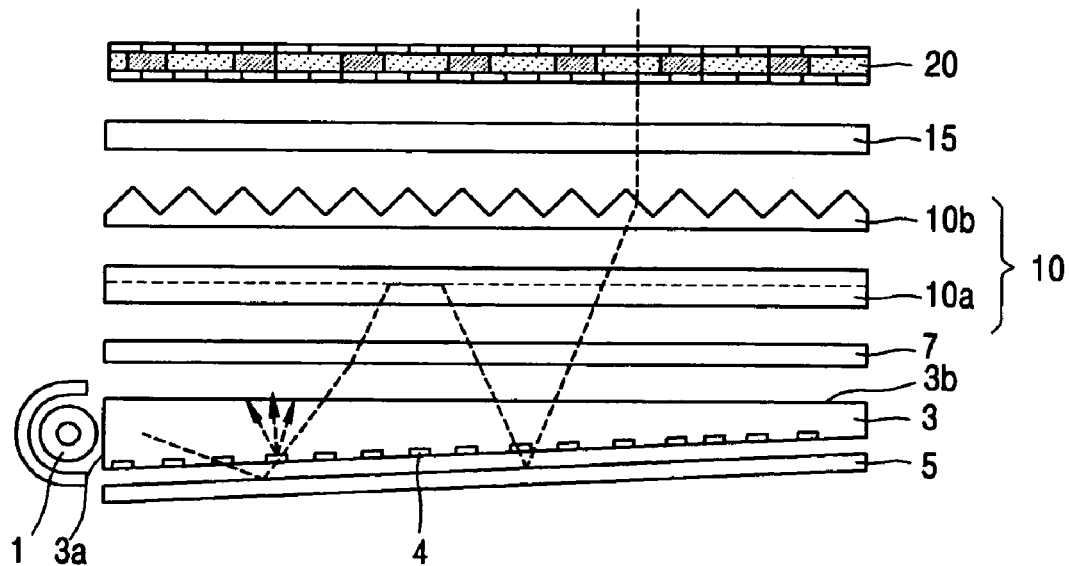
FIG. 1 is a cross-sectional view of a conventional edge type backlight unit.
Figure 2:
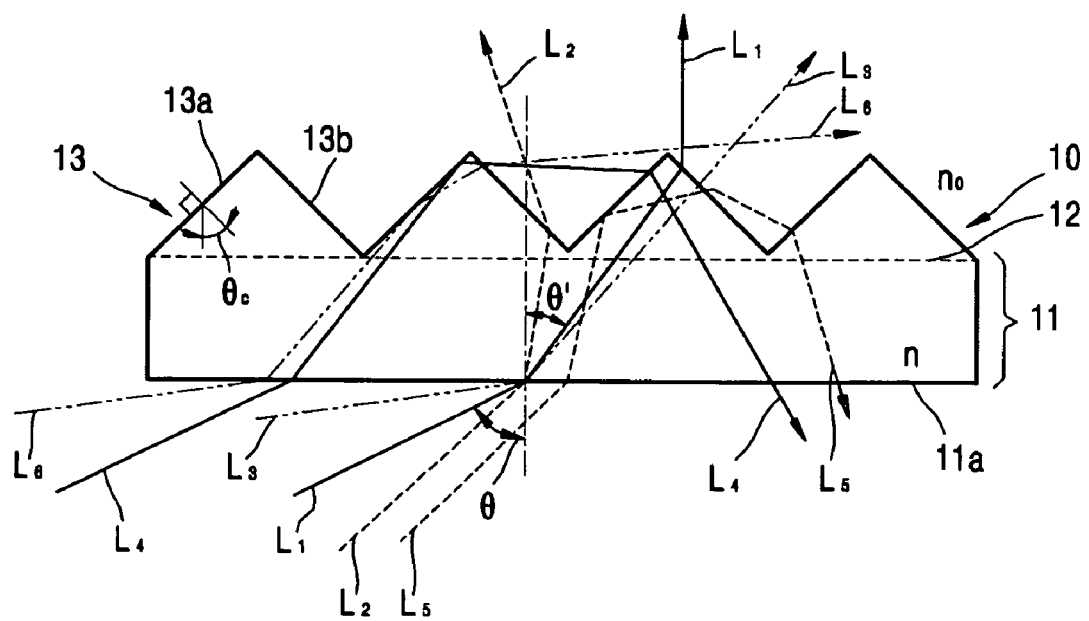
FIG. 2 is a view illustrating part of the prism sheet shown in FIG. 1.
Figure 3:
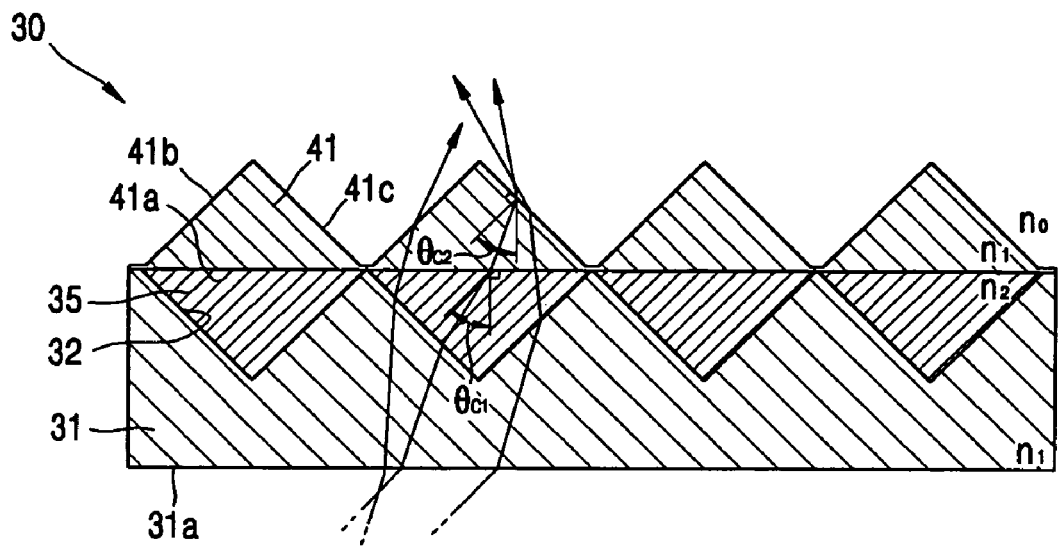
FIG. 3 is a cross-sectional view of a prism sheet according to a first exemplary embodiment of the present invention.

Referring to FIG. 3, a prism sheet 30 according to a first exemplary embodiment of the present invention is formed of transparent materials and includes a substrate 31, a refractive member 35, and a prism 41. The substrate 31 transmits light incident through an incident surface 31a to proceed toward the prism 41 and includes at least one groove 32 formed in a surface opposite to the incident surface 31a. The groove 32 includes a plurality of grooves arranged parallel to one another as shown in FIG. 3, in which four grooves are formed, as an example.

The refractive member 35 is provided in each groove 32 and has a relatively higher refractive index n2 than the refractive index $n_1$ of the substrate 31. Thus, all of the light incident on the refractive member 35 from the substrate 31 is incident on the refractive member 35 at an exit angle relatively smaller than an incident angle. The refractive incident angle can be set differently according to a difference in the refractive index between the substrate 31 and the refractive member 35.

The prism 41 is arranged to face each refractive member 35 to refract and transmit incident light. For this purpose, the prism 41 includes an incident surface 41a facing the refractive member 35 and first and second exit surfaces 41b and 41c that are arranged to face each other at a predetermined angle to refract and transmit the incident light. Also, the prism 41 is formed of a material having a relatively lower refractive index than the refractive member 35.

The prism 41 is formed of the same material having the same refractive index $n_1$ as that of the substrate 31. For example, the substrate 31 and the prism 41 are formed of acryl-based resin, such as polymethyl methacrylate (PMMA) having a refractive index n1 of 1.49309 with respect to light having a wavelength of 546.1 nm.

The refractive member 35 is formed of a material having a relatively higher refractive index $n_2$ than the refractive index $n_1$ of the substrate 31 and the prism 41. To this end, the refractive member 35 can be formed of a plastic material, such as, for example, cyclic olefin copolymer (COC) having a refractive index of 1.53419 with respect to light having a wavelength of 546.1 nm, polycarbonate (PC) having a refractive index of 1.59102 with respect to the same light, and polyetherimide having a refractive index of 1.65812 with respect to the same light.

Figure 4A:
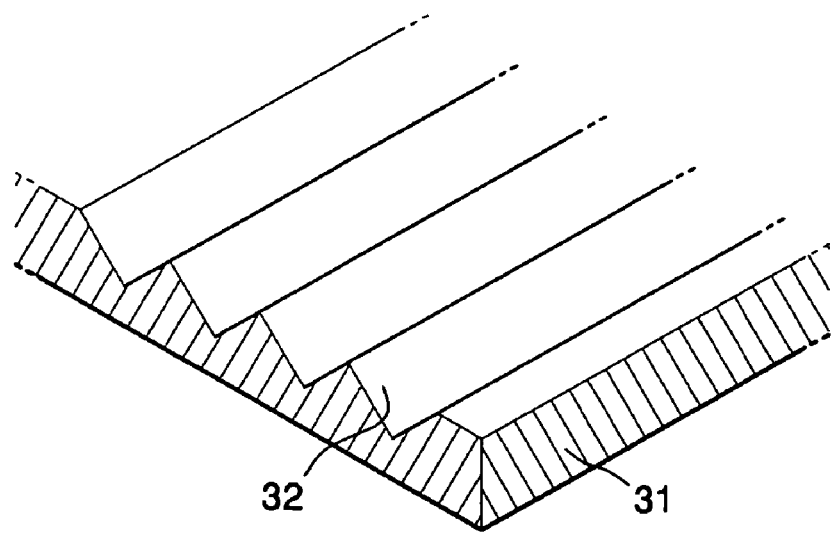
FIGS. 4A through 4D are perspective views showing a manufacturing process of the prism sheet of FIG. 3.

The groove 32 has a triangular section as shown in FIG. 4a and the refractive member 35 has an inverted triangular section that is symmetrical to the shape of the prism 41.

In the prism sheet 30 configured as described above, since light that proceeds from the refractive member 35 to the incident surface 41a of the prism 41 is incident on the incident surface 41a at an angle smaller than a critical angle $\theta_{c1}$ determined by the relationship in the refractive index between the refractive member 35 and the prism 41, all light proceeds toward the prism 41 without being totally reflected at a boundary portion. Since the refractive index $n_2$ of the refractive member 35 is relatively higher than the refractive index $n_1$ of the prism 41, the light is incident on the prism 41 at an exit angle greater than the incident angle of the light incident on the incident surface 41a.

The light incident on the prism 41 exits to a medium of air having a refractive index n0 through the first and second exit surfaces 41b and 41c disposed to be inclined with respect to the incident surface 41a. In this case, since the refractive index n1 of the prism 41 is greater than the refractive index n0 of the air medium, when the light is incident at an angle greater than the critical angle $\theta_{c2}$ at the boundary surface, total reflection may occur. However, since the refractive member 35 primarily refracts the light proceeding toward the prism 41 so that the incident angle of the light incident on the boundary portion between the air and the first and second exit surfaces 41b and 41c of the prism 41 becomes smaller than the critical angle $\theta_{c2}$, total internal reflection can be prevented.

Figure 4B:
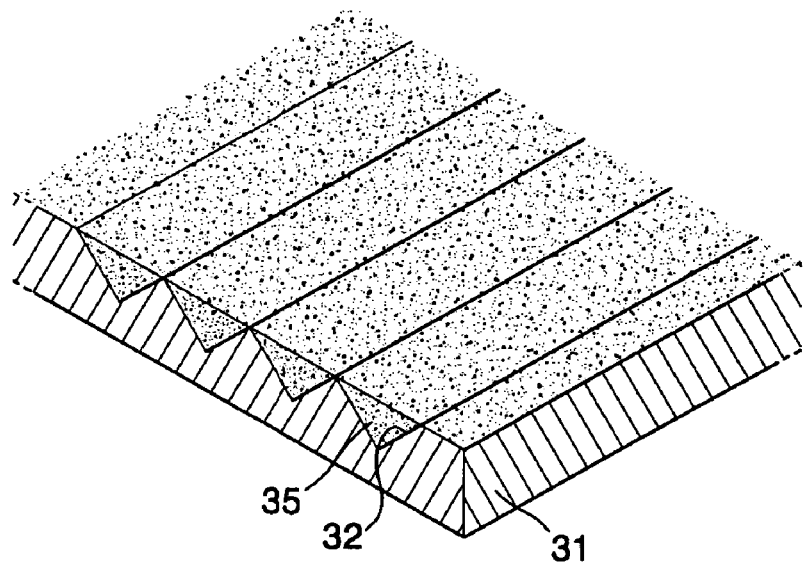
Figure 4C:
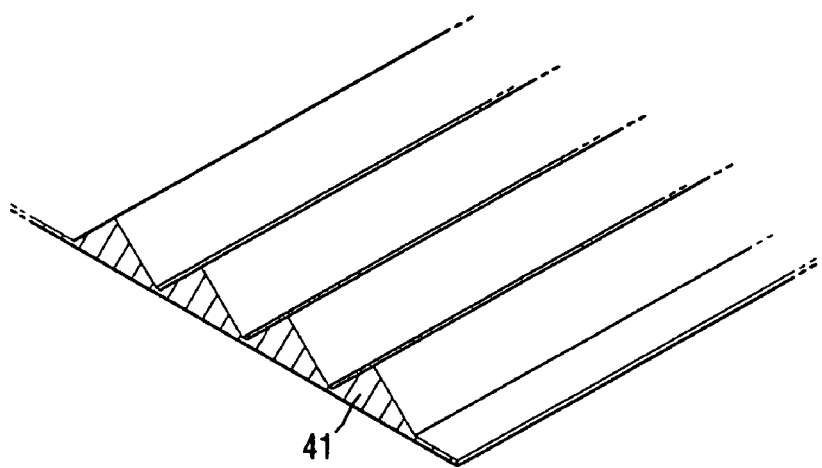
Figure 4D:
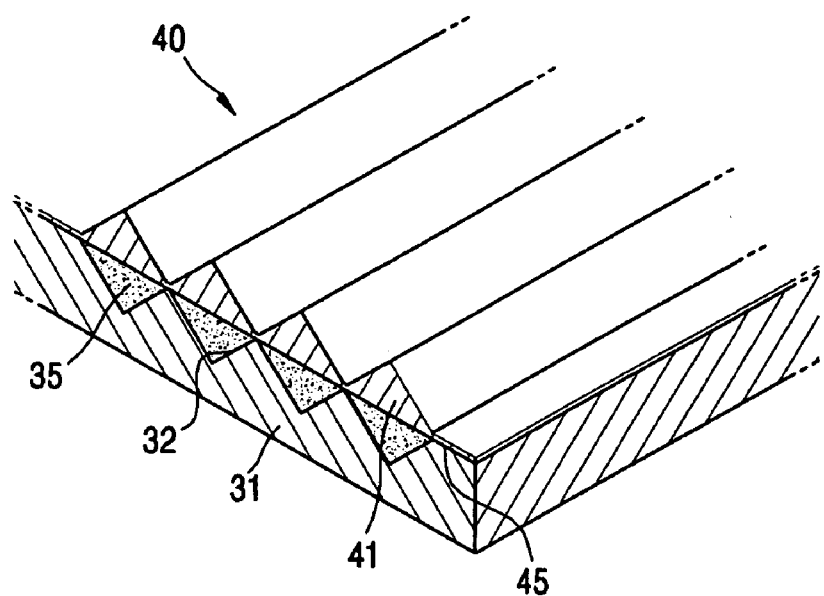

FIGS. 4A through 4D show the manufacturing process of the prism sheet of FIG. 3. Referring to FIG. 4A, acryl-based resin such as PMMA, for example, is prepared and the substrate 31 where the groove 32 is formed is manufactured through a molding or embossing process. As shown in FIG. 4B, the groove 32 is filled with a highly refractive member such as COC, PC, or polyetherimide, for example, ULTEM, to form the refractive member 35. Also, as shown in FIG. 4C, acryl-based resin such as PMMA, for example, is prepared and molded to manufacture the prism 41 in which a plurality of triangular prism structures are arranged parallel to one another. As shown in FIG. 4D, the prism 41 is aligned on the substrate 31 prepared by the process of FIG. 4B and bonded thereto using an adhesive 45, so that the prism sheet is provided according to the first exemplary embodiment shown in FIG. 3.

Figure 5:
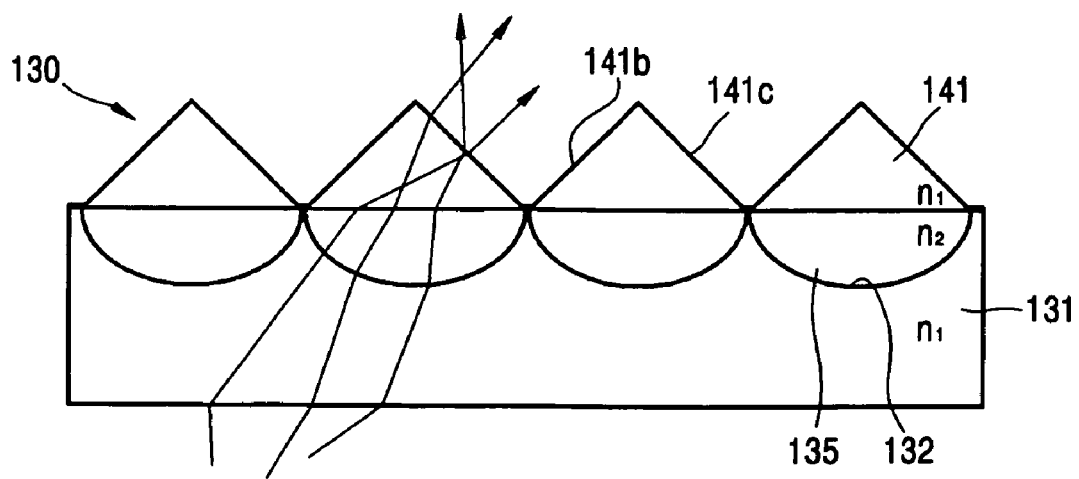
FIG. 5 is a cross-sectional view of a prism sheet according to a second exemplary embodiment of the present invention.

FIG. 5 illustrates a prism sheet according to a second exemplary embodiment of the present invention. Referring FIG. 5, a prism sheet 130 according to the second exemplary embodiment of the present invention is formed of transparent members and includes a substrate 131, a refractive member 135, and a prism 141. The prism sheet 130 according to the second exemplary embodiment, compared to the prism sheet 30 of FIG. 3 according to the first exemplary embodiment, is distinguished in that the shape of the refractive member 135 is modified while the other structures and functions remain the same.

The refractive member 135 is formed in a groove 132 in a semicircular sectional shape. The refractive member 135 is formed of a material having a relatively higher refractive index than the substrate 131 and the prism 141. The sectional shape of the refractive member 135 is not limited to the semicircular shape and a variety of shapes such as an oval shape or a non-circular round shape or the like, for example, are acceptable.

Accordingly, by arranging the refractive member 135 below the prism 141 to primarily refract incident light, an incident angle of light incident on the prism 141 is decreased so that most of the light refracts and transmits through first and second exit surfaces 141b and 141c of the prism 141.

Figure 6:
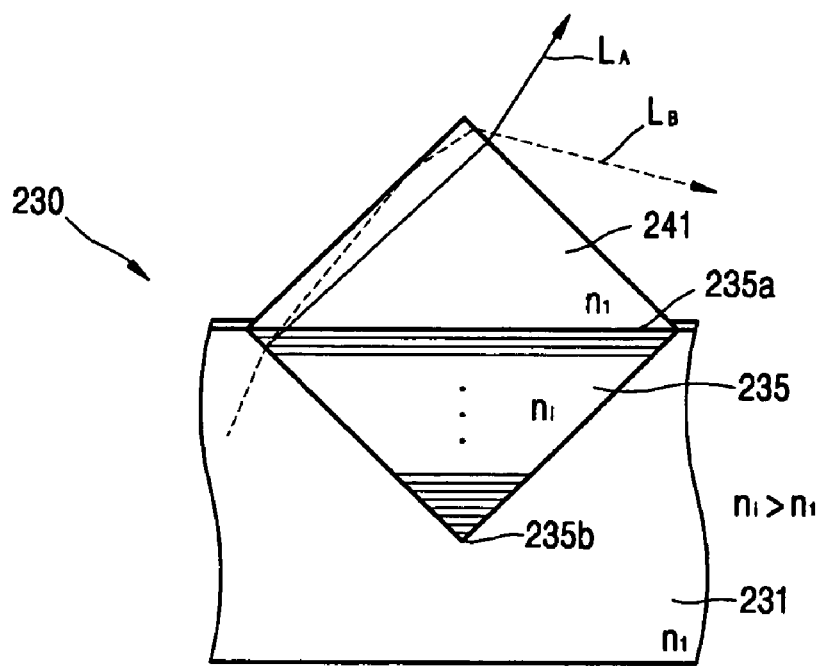
FIG. 6 is a cross-sectional view illustrating parts of a prism sheet according to a third exemplary embodiment of the present invention.
Figure 7:
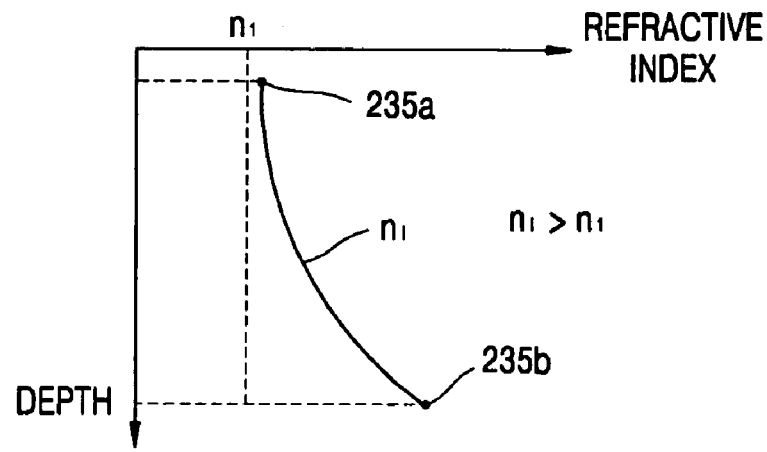
FIG. 7 is a graph showing a change in the refractive index according to the depth of the refractive member of FIG. 6.

FIG. 6 illustrates major parts of a prism sheet according to a third exemplary embodiment of the present invention. FIG. 7 is a graph showing a change in the refractive index according to the depth of the refractive member of FIG. 6. Referring to FIG. 6, a prism sheet 230 according to the third exemplary embodiment of the present invention includes a substrate 231, a refractive member 235, and a prism 241. The prism sheet 230 according to the present exemplary embodiment, compared to the prism sheets 30 of FIG. 3 and 130 of FIG. 5 according to the first and second embodiments, is distinguished in that the refractive index characteristic of the refractive member 235 is modified while the other structures and functions are the same.

The refractive member 235 has a gradient of the refractive index that increases from a position close to the prism 241 to a position far from the prism 241. That is, assuming that a surface of the refractive member 235 close to the prism 241 is 235a and an apex disposed at the farthest position from the prism 241 is 235b, the distribution of the refractive index $n_1$ of the refractive member 235 is shown in FIG. 7. That is, the refractive index gradually increases from the surface 235a close to the prism 241 to the apex 235b. Also, the refractive index $n_i$ of the refractive member 235 has a value greater than the refractive index $n_1$ of the substrate 231 throughout the entire area. The refractive member 235 can be embodied by depositing a plurality of layers having gradually increasing refractive indexes.

In the refractive member 235 having the above-described refractive index gradient, since light incident on a corner portion of the refractive member 235 proceeds in a direction indicated by a solid line $L_A$, instead of a dotted line $L_B$, the light can be used as an effective light so that optical efficiency is further improved.

Figure 8:
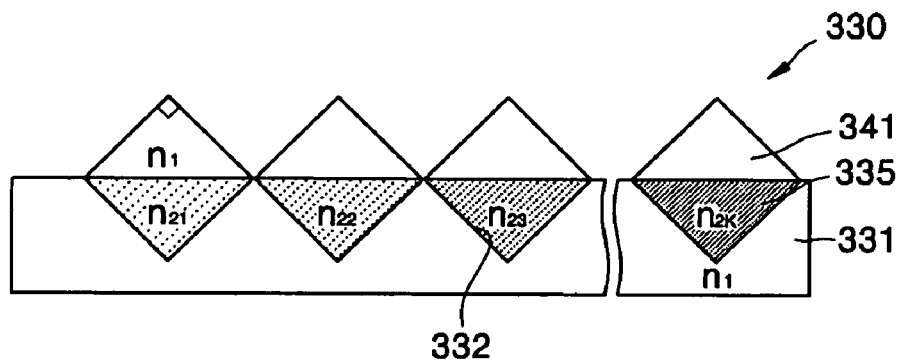
FIG. 8 is a cross-sectional view illustrating parts of a prism sheet according to a fourth exemplary embodiment of the present invention.

FIG. 8 illustrates major parts of a prism sheet according to a fourth exemplary embodiment of the present invention. Referring to FIG. 8, a prism sheet 330 according the fourth exemplary embodiment of the present invention includes a substrate 331, a plurality of refractive members 335, and a plurality of prisms 341. The prism sheet 330 in the exemplary embodiment of FIG. 8, compared to the prism sheets according to the first through third embodiments, is distinguished in that the refractive index characteristics of the refractive members 335 are modified while the other structures and functions are the same.

That is, the substrate 331 includes a plurality of grooves 332 arranged parallel to one another. The refractive members 335 are respectively disposed in the grooves 332. At least one of the refractive members 335 has a different refractive index. More preferably, but not necessarily, the refractive indexes of the refractive members 335 are different from one another and the refractive members 335 are arranged in order of the refractive index thereof. Referring to FIG. 8, in the distribution of the refractive indexes, the refractive members 335 have the refractive indexes $n_{21}, n_{22}, n_{23}, \ldots, n_{2k}$ from the left to right and the amount thereof is in order that $n_{21} < n_{22} < n_{223} < n_{2k}$. When the prism sheet 330 having such a refractive index distribution is employed in an edge type backlight unit, irregularity in luminance due to a difference in the light transmissivity according to the position on a light exit surface of a light guide panel can be compensated for. That is, by improving a transmissivity efficiency of a portion located far from a light source by increasing the refractive index of a refractive member located farther from the light source than the refractive index of a refractive member located close to the light source, the luminance of the portion located far from the light source having a relatively lower transmissivity can be increased.

In the present exemplary embodiment, each of the refractive members 335 can have a refractive index gradient in which the refractive index increases as the refractive member is located farther from the portion close to the prism, as described with reference to FIG. 7.

Figure 9:
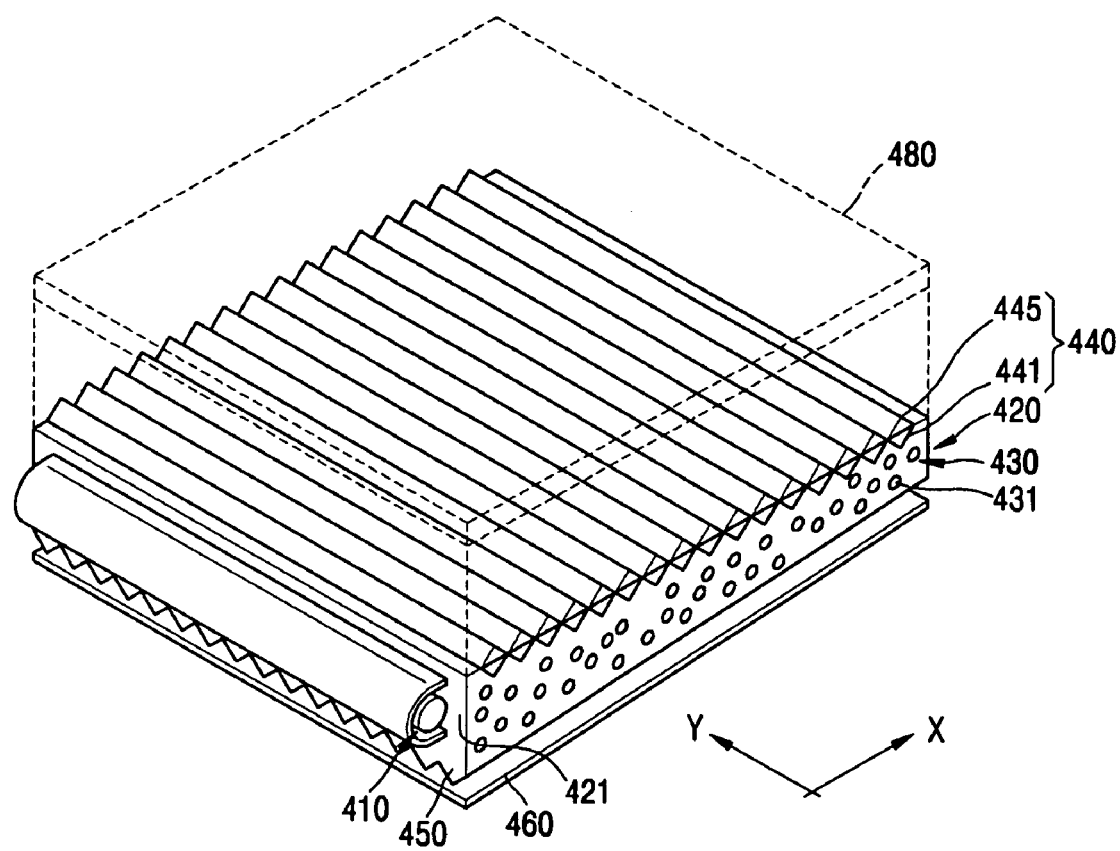
FIG. 9 is a perspective view of a backlight unit according to a further exemplary embodiment of the present invention.
Figure 10:
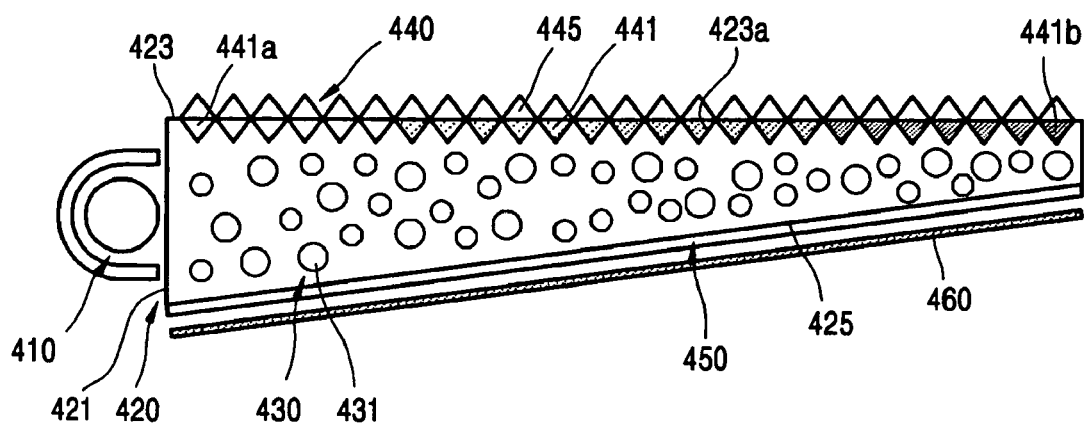
FIG. 10 is a cross-sectional view of the backlight unit of FIG. 9.

FIG. 9 is a perspective view of a backlight unit according to a further exemplary embodiment of the present invention. FIG. 10 is a cross-sectional view of the backlight unit of FIG. 9. Referring to FIGS. 9 and 10, a backlight unit according to a further exemplary embodiment of the present invention includes a light guide panel 420, a light source 410 arranged at at least one side of the light guide panel 420, a reflective panel 460, and a prism sheet 440.

The light source 410 is a linear light source such as a CCFL as shown in the drawings, or a point light source such as a light emitting diode (LED), which emits light toward a side surface 421 of the light guide panel 420. The light guide panel 420 guides procession of the light emitted from the light source 410 and incident on the side surface 421 and has a light exit surface 423. The light guide panel 420 has a structure in which a thickness thereof decreases, that is, a lower surface 425 that is a surface opposite to the light exit surface 423 is inclined, to improve an efficiency of the light exiting through the light exit surface 423 located far from the light source 410 so that uniform light is emitted throughout an overall surface of the light exit surface 423.

The reflective panel 460 is separated a predetermined distance from the lower surface 425 of the light guide panel 420 and reflects the light incident through the lower surface 425 to proceed toward the light exit surface 423.

The prism sheet 440 is formed on the light exit surface 423 to refract and transmit the light exiting through the light exit surface 423 in an X-axis direction so that the amount of effective light is increased. The prism sheet 440 includes a plurality of refractive members 441 formed inwardly in the light guide panel 420 and a plurality of prisms 445 for refracting and transmitting incident light. To this end, at least one groove 423a is inwardly formed in the light exit surface 423 of the light guide panel 420. The groove 423a has a triangular section and is formed lengthwise in a Y-axis direction. In particular, a plurality of the groove 423a is provided so as to neighbor one another in the same direction.

The refractive members 441 are respectively provided in the grooves 423a and have a relatively higher refractive index than that of the light guide panel 420. The prisms 445 are arranged to face the refractive members 441 to refract and transmit incident light, each having a relatively lower refractive index than that of each of the refractive members 441.

Each of the refractive members 441 as shown in the drawings can be formed in the grooves 423a to have a shape symmetrical to the shape of each of the prisms 445. Like the prism sheet 130 shown in FIG. 5, each of the refractive members 441 can be formed to have a section such as a semicircular shape, an oval shape or a non-circular round shape or the like, for example. Also, the refractive members 441, like the prism sheet 230 shown in FIGS. 6 and 7, can have a refractive index gradient in which a refractive index increases from a portion of each of the refractive members 441 located far from a portion close to the prism 445 to a portion thereof closer to the prism 445.

The refractive members 441, like the prism sheet 330 shown in FIG. 8, have different refractive indexes. In this case, the refractive members 441 are arranged such that the refractive index gradually increases from a refractive member located far from the light source 410 to a refractive member 441a located closed to the light source 410. Thus, the refractive member 441b located farthest from the light source 410 has the greatest refractive index. When the refractive members 441 are arranged as above, the light emitted through each of the prisms 445 can have different refractive index with respect to an incident angle distribution. Thus, when the light emitted through the light exit surface 423 has a brightness difference by a difference in the distance from the light source 410, the brightness difference can be compensated for by the prism sheet 440 to a degree.

In exemplary embodiments of the present invention, a second prism sheet 450 can be further provided between the light guide panel 420 and the reflective panel 460. The second prism sheet 450 has the same structure and shape as those of a typical optical prism and refracts and transmits the light proceeding toward the light exit surface 423 of the light guide panel 420 in the Y-axis direction.

The backlight unit according to the exemplary embodiment of FIG. 10 can further include a diffusive member 430 to diffuse and transmit incident light. An exemplary embodiment of the diffusive member 430, as shown in FIGS. 9 and 10, includes a plurality of beads 431 distributed in the light guide panel 420. The beads 431 are transparent beads having a refractive index different from that of the light guide panel 420. The shape of each of the beads 431 may be a ball or an oval and the size thereof can vary. By including the beads 431 in the light guide panel 420, the light transferred via the light guide panel 420 is diffusively reflected so that the light is diffused. In this case, by integrally forming the diffusive member 430 with the light guide panel 420, an overall structure can be made compact while a diffusion function is performed.

Figure 11:
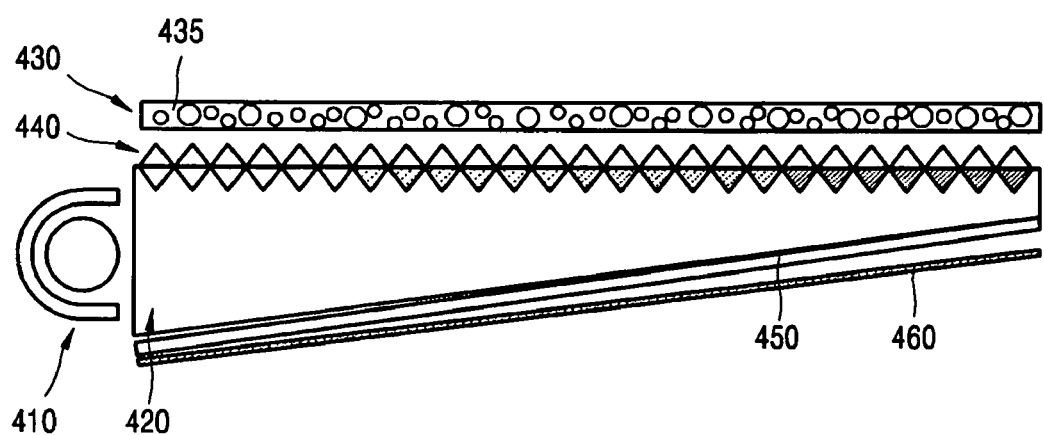
FIG. 11 is a cross-sectional view of a backlight unit for explaining another exemplary embodiment of a diffusive member of FIG. 10.

Another exemplary embodiment of the diffusive member 430 can be a diffusive sheet 435 arranged above the prism sheet 440, as shown in FIG. 11. When an edge type backlight unit configured as described above is employed as a light source of an image forming apparatus having no self-illuminating capability, such as an LCD panel 480 shown in FIG. 9, optical efficiency is improved and a uniform flat light is provided.

Figure 12:
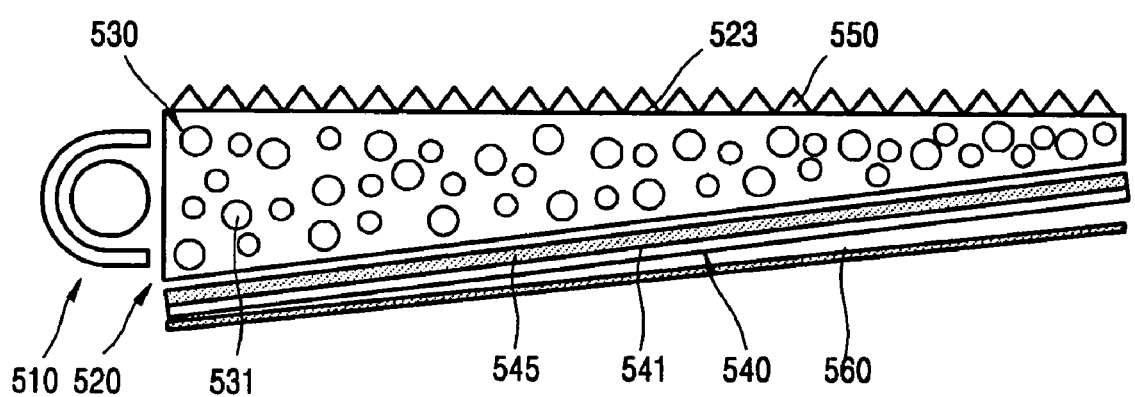
FIG. 12 a cross-sectional view of a backlight unit according to an additional exemplary embodiment of the present invention.

FIG. 12 a cross-sectional view of a backlight unit according to a further exemplary embodiment of the present invention. Referring to FIG. 12, a backlight unit includes a light guide panel 520, a light source 510 arranged at at least one side of the light guide panel 520, a reflective panel 560, and a prism sheet 540. The backlight unit according to the exemplary embodiment of FIG. 12, compared to the backlight unit according to the first exemplary embodiment, is characterized in that the arrangement of the prism sheet 540 is changed. Since the light source 510, the light guide panel 520, and the reflective panel 560 are substantially the same as those of the backlight unit according to the first exemplary embodiment, detailed descriptions thereof are omitted herein.

The prism sheet 540 is arranged between the light guide panel 520 and the reflective panel 560 and refracts and transmits the light exiting through a light exit surface 523 to increase the amount of effective light. The prism sheet 540 includes a substrate 541, a refractive member (not shown) inwardly formed in the substrate 541, and a prism 545 refracting and transmitting incident light. Since the structure and operation of the prism sheet 540 are substantially the same as those of the prism sheet according to the above-described embodiments with reference to FIGS. 3 through 8, detailed descriptions thereof are omitted herein.

Also, apparatuses consistent with the present invention can further include a second prism sheet 550 on the light guide panel 520. The second prism sheet 550 has the same structure and shape as those of a typical optical prism and refracts and transmits the light proceeding toward the light exit surface 523 of the light guide panel 520 to proceed in a direction.

The diffusive member 530 can be formed of a plurality of beads 531 distributed in the light guide panel 520 or a diffusive sheet (not shown) separately provided on the second prism sheet 560.

The prism sheet according to exemplary embodiments of the present invention configured as described above includes at least one refractive member for decreasing an incident angle of light incident on the prism by primarily refracting and transmitting the incident light so that the amount of the effective light transmitting through the prism sheet is increased and, thus, the optical efficiency is improved. When a plurality of the refractive members are provided, since the refractive members have a predetermined refractive index gradient, the path of the light incident on an edge portion of the refractive member can be corrected. Also, by making the refractive indexes of the refractive members to be different from one another and arranging the refractive members in order of the refractive index to make a light collection efficiency by refraction and transmission to be different, a flat light having a difference in the amount of light due to an edge illumination can compensate for the amount of light when the light is incident.

Further, since the backlight unit according to exemplary embodiments of the present invention includes the prism sheet, a difference in the light exit distribution of the light exiting through the light guide panel is compensated for, so that uniformity in the distribution of the finally exiting light is improved. Also, since the amount of effective light is increased, the optical efficiency is improved. The beads can be integrally formed in the light guide panel as the diffusive member so that the overall structure can be made compact.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A prism sheet comprising: a substrate which has a first incident surface, transmits light incident from the first incident surface and has at least one groove disposed inwardly in a surface of the substrate opposed to the first incident surface;
   a refractive member provided in the groove and having a higher refractive index than a refractive index of the substrate; and
   a prism arranged to face the refractive member, refract and transmit incident light, and having a lower refractive index than the refractive index of the refractive member, wherein the prism comprises,
      a second incident surface which faces the refractive member; and
      a first exit surface and a second exit surface which are arranged to face each other at an angle; and,
   wherein a light incident angle to the first exit surface or the second exit surface is smaller than a critical angle for total reflection regardless of an incident angle to the first incident surface.

2. The prism sheet as claimed in claim 1, wherein the groove has a triangular section and the refractive member is formed in the groove to have a shape symmetrical to a shape of the prism.

3. The prism sheet as claimed in claim 1, wherein the groove has one of a semicircular and an oval section and the refractive member is fonned in the groove to have one of a semicircular and an oval section.

4. The prism sheet as claimed in claim 1, wherein the refractive member has a refractive index gradient in which a refractive index increases in a direction away from the prism.

5. The prism sheet as claimed in claim 1, wherein the substrate comprises a plurality of grooves, and a plurality of refractive members are respectively provided in the grooves, the plurality of grooves are arranged parallel to one another and at least one of the refractive members provided in the grooves has a refractive index different from those of other refractive members.

6. The prism sheet as claimed in claim 5, wherein the refractive indexes of the refractive members are different from one another and the refractive members are arranged in order of the refractive index.

7. The prism sheet as claimed in claim 6, wherein at least one of the refractive members have a refractive index gradient in which a refractive index increases in a direction away from the prism.

8. The prism sheet as claimed in claim 1, wherein the substrate and the prism are formed of an identical material.

9. The prism sheet as claimed in claim 8, wherein the substrate and the prism are formed of acryl-based resin.

10. The prism sheet as claimed in claim 1, wherein the refractive member is formed of at least one of a cyclic olefin copolymer, polycarbonate, and polyetherimide.

11. A prism sheet comprising:
    a substrate which has a first incident surface, transmits light incident from the first incident surface and has a plurality of grooves disposed inwardly in a surface of the substrate in an inverted triangular shape, and formed of acryl-based resin;
    a refractive member provided in each of the grooves, the refractive member including at least one of a cyclic olefin copolymer, polycarbonate, and polyetherimide having a higher refractive index than a refractive index of the substrate; and
    a prism arranged to face the refractive member, refract and transmit incident light, and formed of acryl-based resin having a lower refractive index than the refractive index of the refractive member,
    wherein the prism comprises,
       a second incident surface which faces the refractive member; and
       a first exit surface and a second exit surface which are arranged to face each other at an angle; and,
    wherein a light incident angle to the first exit surface or the second exit surface is smaller than a critical angle for total reflection regardless of an incident angle to the first incident surface.

12. A backlight unit comprising:
    at least one light source emitting light;
    a light guide panel guiding a procession of light emitted from the light source and incident on a side surface of the light guide panel, the light guide panel having a light exit surface through which the light exits;
    a reflective panel separated a predetermined distance from a surface opposite to the light exit surface of the light guide panel, the reflective panel reflects incident light toward the light exit surface; and
    a prism sheet which comprises,
    a substrate which has a first incident surface, transmits light incident from the first incident surface and has at least one groove disposed inwardly in a surface of the light guide panel opposed to the first incident surface;
    a refractive member provided in the at least one groove and having a higher refractive index than a refractive index of the light guide panel; and
    a prism arranged to face the refractive member, refract and transmit incident light, and having a relatively lower refractive index than the refractive index of the refractive member,
    wherein the prism comprises,
       a second incident surface which faces the refractive member; and
       a first exit surface and a second exit surface which are arranged to face each other at an angle; and, wherein a light incident angle to the first exit surface or the second exit surface is smaller than a critical angle for total reflection regardless of an incident angle to the first incident surface.

13. The backlight unit as claimed in claim 12, further comprising a diffusive member which diffuses and transmits incident light.

14. The backlight unit as claimed in claim 12, wherein the diffusive member is a diffusive sheet arranged on the prism sheet.

15. The backlight unit as claimed in claim 12, wherein the diffusive member is a plurality of beads distributed in the light guide panel.

16. The backlight unit as claimed in claim 12, further comprising a second prism sheet arranged between the light guide panel and the reflective panel and having a plurality of prisms which refracts and transmits incident light.

17. The backlight unit as claimed in claim 12, wherein the at least one groove has a triangular section and the refractive member is formed in the at least one groove and has a shape symmetrical to a shape of the prism.

18. The backlight unit as claimed in claim 17, wherein the refractive member has a refractive index gradient in which a refractive index increases in a direction away from the prism.

19. The backlight unit as claimed in claim 12, wherein the refractive member comprises a plurality of refractive members having different refractive indexes and which are arranged such that the refractive index increases from a portion close to the light source to a portion located far from the light source.

20. A backlight unit comprising:
at least one light source emitting light;
a light guide panel which guides a procession of light emitted from the light source and incident on a side surface of the light guide panel, the light guide panel having a light exit surface through which the light exits;
a reflective panel separated a predetermined distance from a surface opposite to the light exit surface of the light guide panel, the reflective panel reflects incident light toward the light exit surface; and
a prism sheet disposed between the light guide panel and the reflective panel, which comprises,
a substrate which has a first incident surface, transmits light incident from the first incident surface and has at least one groove inwardly formed in a surface of the substrate opposed to the first incident surface;
a refractive member provided in the groove and having a higher refractive index than a refractive index of the substrate; and
a prism arranged to face the refractive member, refract and transmit incident light, and having a lower refractive index than the refractive index of the refractive member,
wherein the prism comprises,
a second incident surface which faces the refractive member; and
a first exit surface and a second exit surface which are arranged to face each other at an angle; and,
wherein a light incident angle to the first exit surface or the second exit surface is smaller than a critical angle for total reflection regardless of an incident angle to the first incident surface.

21. The backlight unit as claimed in claim 20, wherein the refractive member of the prism sheet comprises a plurality of refractive members having different refractive indexes and which are arranged such that the refractive index increases from a portion close to the light source to a portion located far from the light source.

22. The backlight unit as claimed in claim 20, further comprising a diffusive member which diffuses and transmits incident light.

23. The backlight unit as claimed in claim 22, wherein the diffusive member is a diffusive sheet arranged on the light exit surface of the light guide panel.

24. The backlight unit as claimed in claim 22, wherein the diffusive member is a plurality of beads distributed in the light guide panel.

25. The backlight unit as claimed in claim 22, further comprising a second prism sheet arranged on the light guide panel and having a plurality of prisms which refract and transmit incident light.

26. A backlight unit comprising:
at least one light source emitting light;
a light guide panel which guides a procession of light emitted from the light source and incident on a side surface of the light guide panel, the light guide panel having a light exit surface through which the light exits;
a reflective panel separated a predetermined distance from a surface opposite to the light exit surface of the light guide panel, the reflective panel reflects incident light toward the light exit surface;
a prism sheet which comprises,
a substrate which has a first incident surface, transmits light incident from the first incident surface and has a plurality of grooves disposed inwardly in a surface of the light guide panel opposed to the first incident surface;
a plurality of refractive members respectively provided in the grooves, having a higher refractive index than a refractive index of the light guide panel, and arranged such that the refractive index increases from a portion close to the light source to a portion located far from the light source; and
a plurality of prisms arranged to face the refractive members, refract and transmit incident light, and has a relatively lower refractive index than the refractive index of the refractive member, the plurality of prisms comprising,
a second incident surface which faces the plurality of refractive members;
incident surfaces which face the refractive members; and
first exit surfaces and second exit surfaces which are arranged to face each other at an angle; and
a light incident angle to the first exit surfaces or the second exit surfaces is smaller than a critical angle for total reflection regardless of an incident angle to the first incident surface;
a diffusive member formed of a plurality of beads distributed in the light guide panel which diffuses and transmits incident light; and
a second prism sheet arranged between the light guide panel and the reflective panel and comprising a plurality of prisms which refracts and transmits incident light in a direction.

* * * * *